C. ROBERTS.
INCUBATOR THERMOMETER.
APPLICATION FILED APR. 12, 1913.
1,079,724.
Patented Nov. 25, 1913.
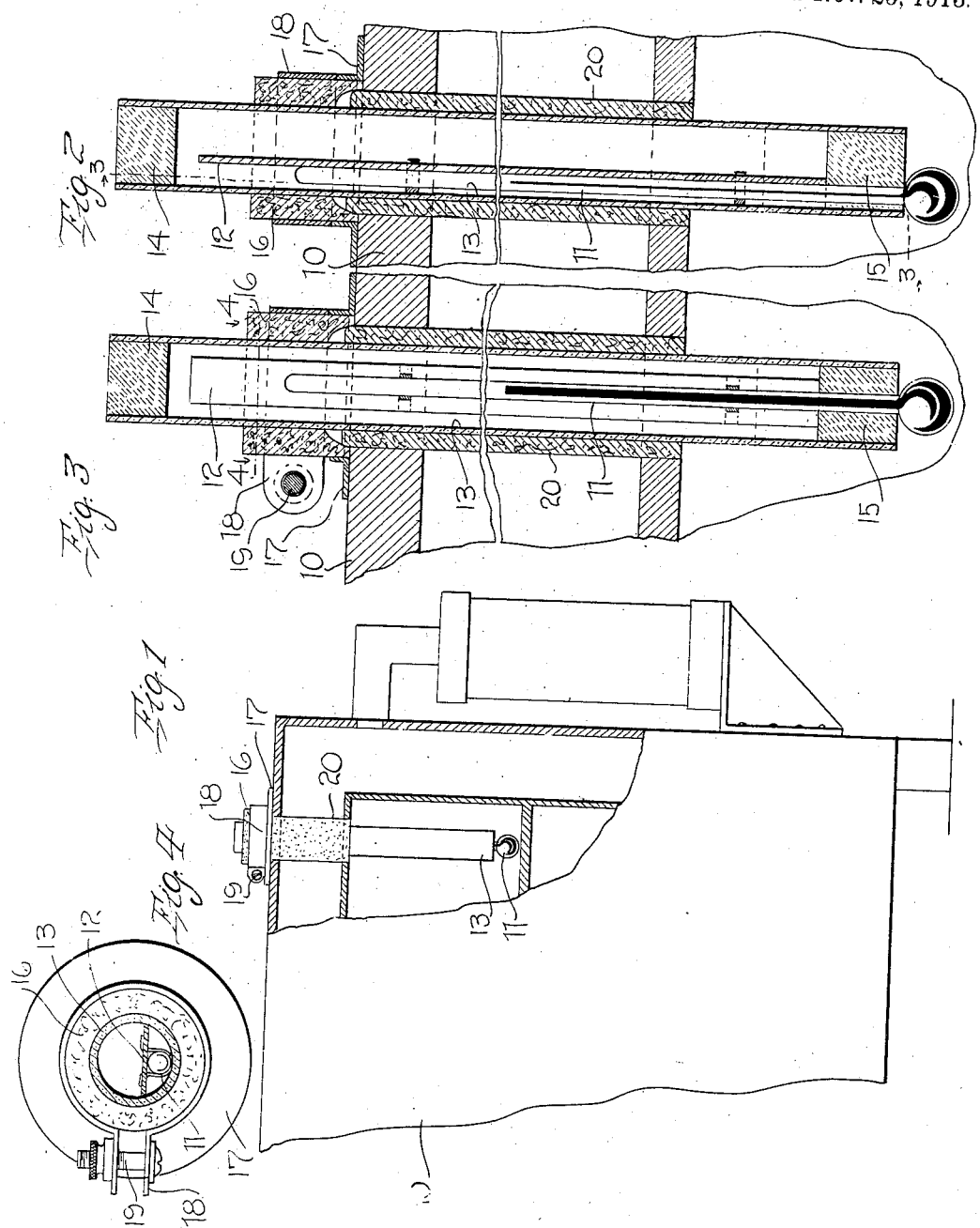
Inventor
CLARA ROBERTS
Witnesses
By Watson E. Coleman
Attorney

UNITED STATES PATENT OFFICE.

CLARA ROBERTS, OF NEWBERRY, MICHIGAN.

INCUBATOR-THERMOMETER.

1,079,724.  Specification of Letters Patent.  Patented Nov. 25, 1913.

Application filed April 12, 1913. Serial No. 760,716.

*To all whom it may concern:*

Be it known that I, CLARA ROBERTS, a citizen of the United States, residing at Newberry, in the county of Luce and State of Michigan, have invented certain new and useful Improvements in Incubator-Thermometers, of which the following is a specification, reference being had to the accompanying drawings.

This invention relates to thermometers for incubators and has for an object to provide a thermometer that may be permanently attached in operative position upon an incubator, and may be withdrawn from the incubator to determine the temperature of the egg chamber without the danger of any cool air from outside gaining access to the egg chamber during such withdrawal.

A further object of the invention is to provide a thermometer which will be housed against the effect of the exterior air at all times.

A further object is to provide a thermometer which will be housed against being affected by the temperature of the walls of the incubator.

A still further object is to provide a thermometer which will have a stop that is adjustably secured to the thermometer and may be set at any desired point on the thermometer to limit insertion of the thermometer into the egg chamber.

With the above objects in view the invention consists of certain novel details of construction and combination of parts hereinafter fully described and claimed, it being understood that various modifications may be made in the minor details of construction within the scope of the appended claims.

In the accompanying drawing illustrating this invention: Figure 1 is a front elevation of a conventional incubator with portions broken away to show the application of my invention. Fig. 2 is an enlarged longitudinal sectional view through the thermometer applied. Fig. 3 is a longitudinal sectional view on the line 3—3 Fig. 2. Fig. 4 is a cross sectional view on the line 4—4 Fig. 3.

Referring now to the drawing in which like characters of reference designate similar parts, 10 designates a conventional incubator of the double walled type.

In constructing my invention, an ordinary thermometer 11 with its scale 12 is inclosed in a glass tube 13 the top of which is closed by a plug 14 and the bottom of which is closed by a plug 15 which latter anchors the thermometer and its scale rigidly in the tube. The top plug 14 may be constructed of cork or other suitable material, and the bottom plug 15 may be formed of any suitable plastic material which hardens after application, although any preferred material may be employed in constructing these plugs as long as the plugs positively prevent access of air into the interior of the tube. Disposed on the tube is a stop in the nature of an annular ring 16 which may be formed of cork or other yielding material, the ring carrying at the bottom an abutment flange 17, and there being a split clamp ring 18 arranged to encircle the stop ring and bind the same upon the tube 13 near the top of the latter. By loosening the draw bolt 19 of the clamp ring, the stop ring 16 may be moved to any desired position longitudinally of the tube and clamped in this adjusted position by tightening the draw bolt.

In applying the invention, openings are formed through the double wall of the incubator, in the present instance such openings being shown in the top wall, and an asbestos tube 20 is disposed in the opening and rigidly secured in position in any preferred manner. This asbestos tube is of sufficient diameter to snugly receive the glass tube 13 the latter being passed through the asbestos tube until the stop ring flange 17 contacts with the outer face of the incubator and limits further insertion of the tube 13. Under ordinary conditions, it may be most desirable to dispose the bulb of the thermometer upon or between the eggs in the egg chamber, and it is obvious that the stop ring 16 may be set at such a position on the tube 13 to limit insertion of the tube 13 beyond a point where the bulb will pass beyond this predetermined position. It is also apparent that the stop ring may be adjusted at any desired position on the glass tube to dispose the bulb of the thermometer in any predetermined position in the egg chamber.

In operation suppose that the device is in the position shown in Fig. 1 wherein the bulb of the thermometer is at about the same level as the tops of the eggs in the egg chamber. To get a reading of the thermometer without opening the incubator doors, the operator grasps the upper end of the tube 13 and withdraws this tube upwardly through the asbestos tube 20 until the reading of the thermometer scale is visible. When the reading has been taken, the operator then forces the glass tube 13 downward until the stop flange 17 limits further insertion of the device.

From the above description it will be seen that the thermometer is not exposed to exterior atmospheric temperature while a reading is being taken, since the thermometer is housed within the airtight glass tube 13. The thermometer furthermore is protected against the effect of the low temperature in the air space between the double walls in the incubator by the asbestos tube 20 which as above described also performs the function of a guide for directing the sliding movements of the thermometer while a reading is being taken. It will be further apparent that the tight engagement of the asbestos tube with the glass tube 13 positively prevents access of air into the egg chamber from without while a reading is being taken or at any other time.

What is claimed, is:—

1. The combination with an incubator, of a guide tube forming a passage from the exterior of the incubator into the egg chamber, a transparent tube slidably fitted in said guide tube, a thermometer inclosed in said transparent tube, and a stop adjustably mounted upon said transparent tube and limiting insertion thereof through said guide tube, as and for the purpose described.

2. The combination with an incubator, of a guide tube forming a passage from the exterior of the incubator into the egg chamber, a transparent tube slidably fitted in said guide tube, a thermometer inclosed in said tube, a ring adjustably mounted on said transparent tube, and an abutment flange carried by said ring, as and for the purpose described.

3. The combination with a receptacle, of a guide tube forming a passage from the exterior of the receptacle into the interior thereof, a transparent tube slidably fitted in said guide tube, a thermometer inclosed in said transparent tube, a ring of yielding material adjustably mounted on said transparent tube to limit the insertion of said tube through said guide tube, and a clamp encircling said ring to bind the same upon the tube, as and for the purpose described.

4. The combination with a receptacle, of a guide tube forming a passage from the exterior of the receptacle into the interior thereof, a transparent tube slidably fitted in said guide tube, a thermometer inclosed in said transparent tube, a yieldable ring adjustably mounted on said transparent tube, an abutment plate carried by said ring, and a clamping member engageable with said ring to bind the same against the periphery of said transparent tube, as and for the purpose described.

In testimony whereof I hereunto affix my signature in the presence of two witnesses.

CLARA ROBERTS.

Witnesses:
JOHN T. TURNBULL,
MARGUERITE STEPHENS.